United States Patent
Shoji (10) Patent No.: US 11,960,782 B1
(45) Date of Patent: Apr. 16, 2024

(54) INFORMATION PROCESSING SYSTEM, IMAGE FORMING SYSTEM, AND INFORMATION PROCESSING METHOD FOR RESTORING OLD VERSION OF TASK FILE VIA IMAGE FORMING WORKFLOW

(71) Applicant: KYOCERA Document Solutions Inc., Osaka (JP)

(72) Inventor: Hidenori Shoji, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/332,515

(22) Filed: Jun. 9, 2023

(51) Int. Cl.
*G06F 3/12* (2006.01)

(52) U.S. Cl.
CPC ............ *G06F 3/1275* (2013.01); *G06F 3/121* (2013.01); *G06F 3/1288* (2013.01)

(58) Field of Classification Search
None
See application file for complete search history.

(56) References Cited

U.S. PATENT DOCUMENTS

| | | | | |
|---|---|---|---|---|
| 2006/0279766 A1* | 12/2006 | Kobayashi | ............ | G06F 3/1221 358/1.14 |
| 2007/0242303 A1* | 10/2007 | Barry | ................. | G06K 15/1857 358/1.15 |
| 2012/0243022 A1* | 9/2012 | Kamei | ................... | G06F 3/1286 358/1.13 |

FOREIGN PATENT DOCUMENTS

JP 2006-343955 A 12/2006

* cited by examiner

*Primary Examiner* — Andrew H Lam
(74) *Attorney, Agent, or Firm* — Hawaii Patent Services; Nathaniel K. Fedde; Kenton N. Fedde (57) ABSTRACT

Provided is an information processing system that can restore an old version of a task file via an image forming workflow. The information processing system has a cloud server and a local server to execute the image forming workflow for a document. The cloud control unit allocates each of tasks of the workflow to the cloud server or the local server. The update accumulation unit accumulates update information of task files allocated to the local server by the cloud control unit. The client control unit sends and receives an execution result of a task allocated to the local server from the cloud server and update information of a file related to the task to and from the cloud server. The local storage unit stores the file related to the task allocated by the local server.

15 Claims, 7 Drawing Sheets

INFORMATION PROCESSING SYSTEM, IMAGE FORMING SYSTEM, AND INFORMATION PROCESSING METHOD FOR RESTORING OLD VERSION OF TASK FILE VIA IMAGE FORMING WORKFLOW

BACKGROUND

The present disclosure particularly relates to an information processing system, an image forming system, and an information processing method that include a cloud apparatus and a local apparatus and execute an image forming workflow for a document.

There exists a typical image forming apparatus such as a multifunctional peripheral (MFP) capable of printing documents and images. There is also an information processing system that includes image forming apparatuses and performs various tasks in a distributed manner.

As a typical technology, a server that manages distributed processing by multiple printers connected to a computer network and having a power-saving mode is disclosed. The server acquires apparatus information and operating status of printers by means of a dynamic job scheduler (DJS). Then, based on the apparatus information and operating status, it selects target apparatuses for distributed processing and notifies the task manager (TM) of the client PC that is the requester of the distributed processing.

SUMMARY

An information processing system of the present disclosure has a cloud apparatus and a local apparatus for executing an image forming workflow for a document, and the cloud apparatus including: a cloud control unit that allocates each of tasks of the workflow to the cloud apparatus or the local apparatus, and an update accumulation unit that accumulates update information of a file related to a task allocated to the local apparatus by the cloud control unit; and the local apparatus including: a client control unit that sends and receives an execution result of the task allocated by the cloud apparatus and the update information to and from the cloud apparatus, and a local storage unit that stores the file related to the task that is allocated to the local apparatus and is acquired by the client control unit.

An image forming system of the present disclosure has a cloud apparatus and a local apparatus for executing an image forming workflow for a document, and the cloud apparatus including: a cloud control unit that allocates each of tasks of the workflow to the cloud apparatus or the local apparatus, and an update accumulation unit that accumulates update information of a file related to a task allocated to the local apparatus by the cloud control unit; and the local apparatus including: a client control unit that sends and receives an execution result of the task allocated by the cloud apparatus and the update information to and from the cloud apparatus, and a local storage unit that stores the file related to the task that is allocated to the local apparatus and is acquired by the client control unit.

An information processing method of the present disclosure is an information processing method executed by an information processing system having a cloud apparatus and a local apparatus for executing an image forming workflow for a document, including the steps of: allocating, by the cloud apparatus, each of tasks of the workflow to the cloud apparatus or the local apparatus; executing, by the local apparatus, a task allocated to the local apparatus; storing, by the local apparatus, a file related to the task allocated to the local apparatus; sending, by the local apparatus, an execution result of the task allocated to the local apparatus and update information of the file of the task to the cloud apparatus; storing, by the cloud apparatus, the update information as a file cache.

DETAILED DESCRIPTION

Embodiment

[System Configuration of Image Forming System X]

Figure 1:
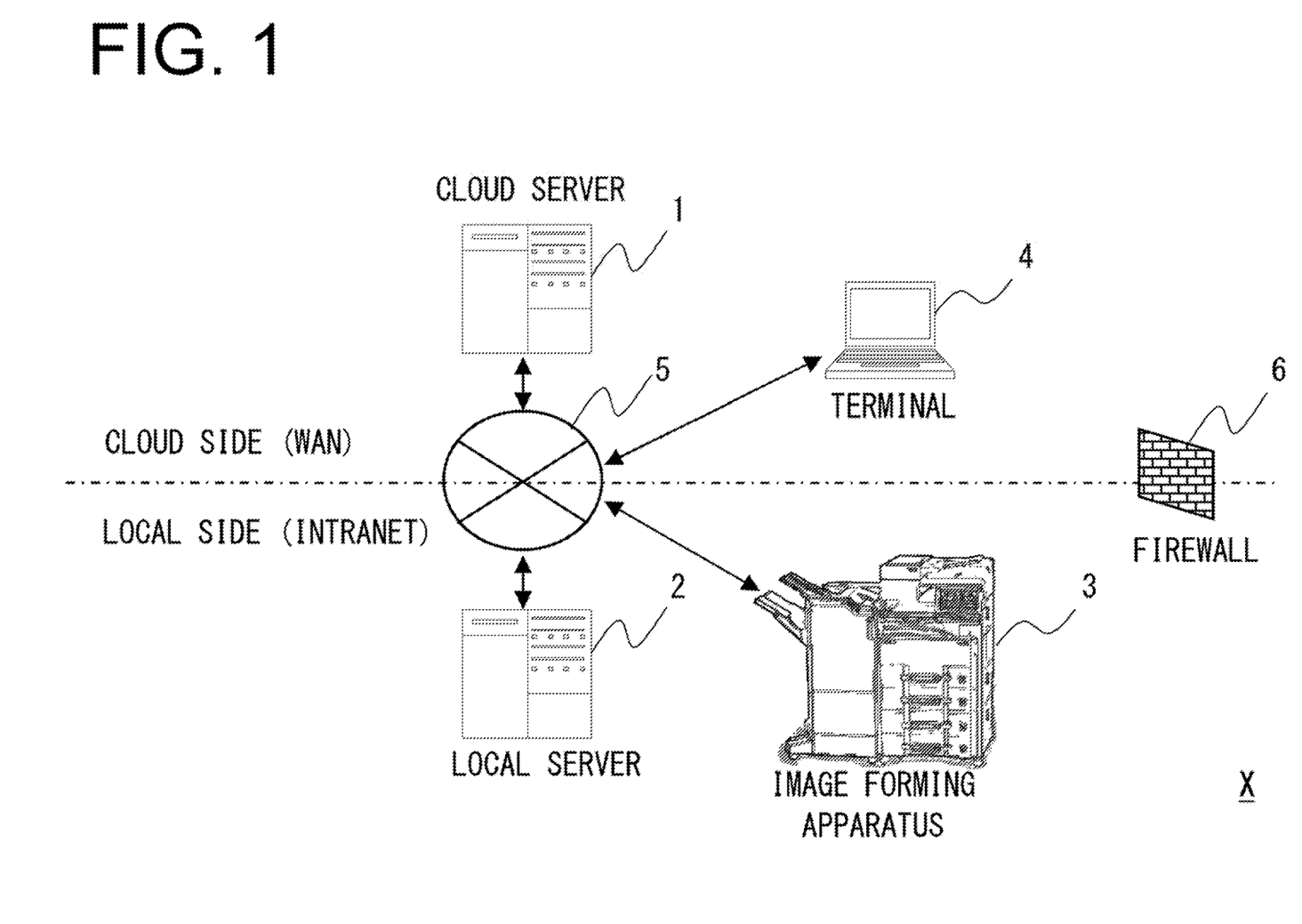
FIG. 1 is a system configuration diagram according to an information processing system for the image forming apparatus of the present disclosure.

Firstly, with reference to FIG. 1, a system configuration of the image forming system X is described.

The image forming system X according to the present embodiment is an example of an information processing system including a cloud server 1, a local server 2, an image forming apparatus 3, a terminal 4, a network 5, and the like.

The cloud server 1 is an example of a cloud apparatus according to the present embodiment. The cloud server 1 may be, for example, a PC (Personal Computer) server, a dedicated machine, and a general-purpose machine. The cloud server 1 is connected to the local server 2 and the image forming apparatus 3, or the like, and is mainly used to handle billing and services.

Figure 3:
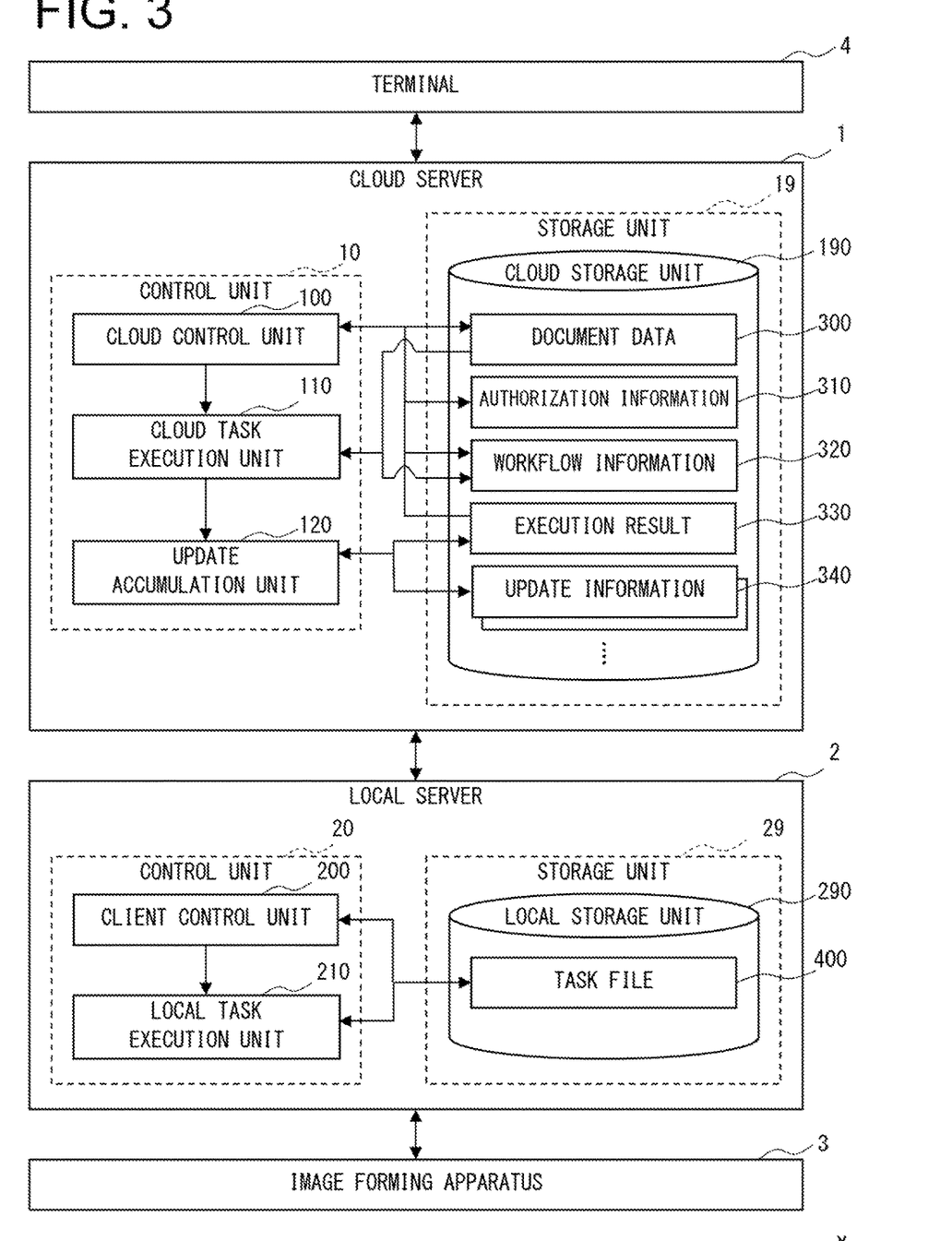
FIG. 3 is a functional configuration diagram according to the information processing system for this form of the disclosure.

In this system, the cloud server 1 mainly allocates a document data 300 (FIG. 3) of a document acquired from the image forming apparatus 3 or the local server 2 to be executed by each of the image forming apparatus 3 and the local server 2.

according to the processing flow set as the workflow as described later. The workflow includes, for example, image processing, OCR (Optical Character Recognition) processing, classification processing, and e-mail transmission processing, processing for a shared folder (a document box, a storage folder), or DMS (Document Management System) for business or office use, as described later.

The local server 2 is an example of a local apparatus for the present embodiment. The local server 2 is an information processing apparatus, for example, such as a server for an intranet that controls the image forming apparatus 3 in the intranet, a PC installed a dedicated application for the image forming apparatus 3, a smartphone, a NAS (Network-Attached Storage), a high-performance image forming apparatus, or the like. The local server 2 can send and receive various data to and from the image forming apparatus 3 on the local side.

The local server 2 also sends and receives various data from the cloud server 1 on the cloud side to perform assigned processing. For this purpose, the local server 2 may be provided with a function of a router, or the like.

The image forming apparatus 3 is an MFP, a network scanner, a document scanner, a network facsimile machine, a printer with scanner function, or the like. The image forming apparatus 3 may be executed an application software (hereinafter simply referred to as "application") for connecting to the cloud server 1.

In the present embodiment, the image forming apparatus 3 may be provided with a function to read (scan) a set document and an image forming function to print or convert a document into an electronic document. In addition, the image forming apparatus 3 may be connected to the local server 2 by the intranet of the network 5 or with USB (Universal Serial Bus), or the like.

The terminal 4 is a PC, smartphone, cell phone, tablet terminal, dedicated terminal, PDA (Personal Digital Assistant), or the like. The terminal 4 can install and execute an application such as a web browser for accessing cloud server 1 and local server 2, a device driver for image forming system X, other dedicated application(s), and the like. This enables the user using terminal 4 to access cloud server 1 and send instructions via the UI (User Interface).

The network 5 is an IP (Internet Protocol) network, or the like. In the configuration example as shown in FIG. 1, the network 5 is separated into the cloud side and the local side.

The cloud side of the network 5 is a WAN (Wide Area Network) such as the Internet, a mobile phone network, or the like, which is a so-called "cloud". In the example as shown in FIG. 1, the cloud server 1 and the terminal 4 are connected to the cloud side of the network 5.

On the other hand, the local side of network 5 is an intranet (Intranet), LAN (Local Area Network, intra-area network), dedicated line, or the like. In the example as shown in FIG. 1, local server 2 and image forming apparatus 3 are connected to the local side of the network 5.

The firewall 6 may be configured between the cloud side and the local side of the network 5 with a router, gateway, or the like. The firewall 6 may be set with specific rule(s) to allow packets, or the like, for a specific port to pass through.

In addition, a VPN (Virtual Private Network) may be set up between the cloud side and the local side. Furthermore, image forming apparatus 3 may reside on the cloud side. Terminal 4 may also exist on the local side.

Figure 2:
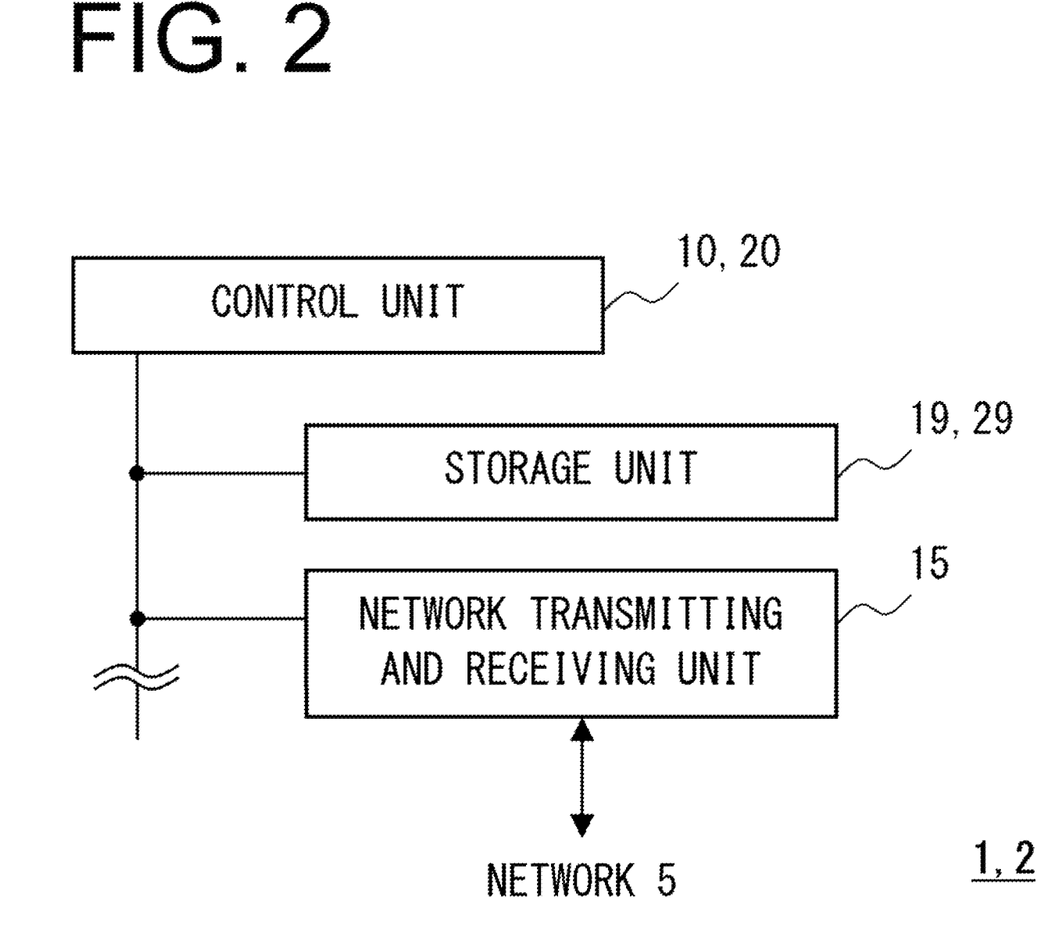
FIG. 2 is a control configuration diagram showing the control of the cloud server and local server as shown in FIG. 1.

Then, with referring to FIG. 2, a control configuration of cloud server 1 and the local server 2 is described. In the present embodiment, the cloud server 1 and the local server 2 is described as examples with similar configurations. The cloud server 1 and the local server 2 include control units 10 and 20, network transmitting and receiving units 15, and storage units 19 and 29.

The control units 10 and 20 are information processing unit such as GPP (General Purpose Processor), CPU (Central Processing Unit), MPU (Micro Processing Unit), DSP (Digital Signal Processor), GPU (Graphics Processing Unit), ASIC (Application Specific Processor), or the like.

The control unit 10 and 20 is made to operate as each component of the functional block as described later by reading a control program stored in the ROM, SSD, or HDD of the storage unit 19, expanding the control program into RAM, and executing it. Also, the GPU, or the like, of the control unit 10 may be provided with an OCR accelerating function, or the like.

The network transmitting and receiving unit 15 is a network connection unit including a LAN board, wireless transmitter/receiver, or the like. for connecting to the network 5.

The memory units 19 and 29 are storage units that is non-transitory recording media. The storage unit 19 and 29 may include RAM (Random Access Memory), or the like, as main memory unit. The memory 19 and 29 may also include ROM (Read Only Memory), HDD (Hard Disk Drive), or the like, as auxiliary memory unit. The ROM may be configured with flash memory, and it may be eMMC (embedded Multi Media Card), SSD (Solid State Drive), or the like. The storage units 19 and 29 may also include external storage media such as various types of flash memory, optical recording media, or the like.

As described later, the storage units 19 and 29 store respective data in the cloud server 1 and the local server 2. In addition, the auxiliary storage of storage units 19 and 29 may store control programs for executing the workflow and controlling the operation of the image forming apparatus 3 as described later. The storage units 19 and 29 may also store a public key and a secret key for file transmission and reception. Furthermore, the storage 19 and 29 may store information about document boxes (storage folders, shared folders) for each user, applications that can be executed on the cloud server 1 and local server 2, information of performance and functions, or the like.

The control unit 10 and 20 may be integrally formed, such as a GPU-built in CPU, chip-on-module package, SOC (System On a Chip), or the like. The control units 10 and 20 may also have built-in RAM, ROM, flash memory, or the like.

[Control Configuration of Image Forming System X]

Figure 4:
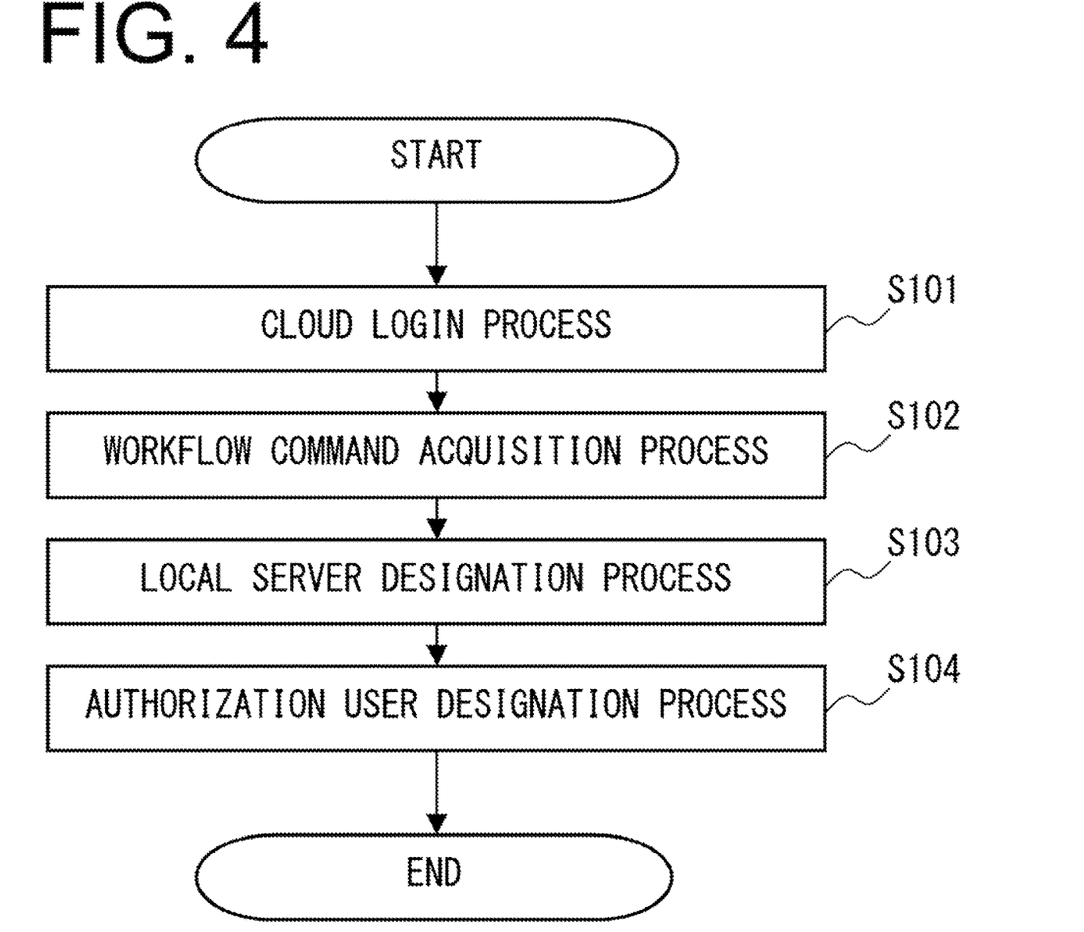
FIG. 4 is a flowchart of the workflow making process according to an embodiment of the present disclosure.

Here, with referring to FIG. 4, the control configuration of the image forming system X according to the embodiment of the present disclosure is described.

In the following, an example in which the cloud server 1 causes the cloud server 1 and the local server 2 to allocate and execute the processing of workflow, which is a series of tasks, is explained.

The control unit 10 of cloud server 1 provides a cloud control unit 100, a cloud task execution unit 110, and an update accumulation unit 120.

The storage unit 19 of the cloud server 1 stores a cloud storage unit 190.

The control unit 20 of local server 2 includes a client control unit 200 and a local task execution unit 210.

The storage unit 29 of the local server 2 stores a local storage unit 290.

The cloud control unit 100 allocates, distribute, or assigns (Hereafter, simply called "allocate") each of tasks of the workflow set in the workflow information 320 to the cloud server 1 or the local server 2. The cloud control unit 100 can change the allocation of each of tasks according to the authorization information 310 of the user who instructs the execution of the workflow.

Alternatively, the cloud control unit 100 can change the allocation according to the authorization of the application to be executed on the local server 2 as the authorization information 310.

Furthermore, the cloud control unit 100 can specifies authorization and a user who can execute the application. Then, the cloud control unit 100 can generate the workflow by adding a script for executing the application on the local server 2.

Additionally, the cloud control unit 100 can also present the progress of the execution of the workflow in response to a request from another apparatus. In the present embodiment, it is possible to perform this presentation via user access from terminal 4 or image forming apparatus 3 as the other apparatuses.

Furthermore, the cloud control unit 100 can also set and restrict the storage location and application execution based on the metadata of the document data 300 processed in the workflow.

In the present embodiment, the cloud control unit 100 can also acquire the document data 300 from the terminal 4 and temporarily store it in the storage unit 19.

Furthermore, the cloud control unit 100 can also send the update information 340 to the local server 2 by the user instruction. This allows the task file 400 to be restored to each version. Here, the cloud control unit 100 can select the update information 340 based on the user instruction to restore the task file 400 stored in the local storage unit 290 of the local server 2 to an older version.

Alternatively, the cloud control unit 100 can select the update information 340 based on the execution result 330 of the workflow and have it restored to the older version.

In this case, specifically, if the execution result 330 of the workflow is a failure, the cloud control unit 100 may be able to restore to the version before the failure.

The cloud task execution unit 110 executes tasks assigned to the cloud server 1 by the cloud control unit 100. In the present embodiment, the cloud task execution unit 110 causes each application to execute a task that has been determined by the cloud control unit 100 to be executed by the cloud server 1, and it obtains the execution results 330.

The update accumulation unit 120 stores the update information 340 of the task file 400 allocated to the local server 2 by the cloud control unit 100.

The client control unit 200 sends and receives the document data 300, the task file 400, the execution result 330 of the task allocated by the cloud server 1, and the update information 340 to and from the cloud server 1. Specifically, the client control unit 200 can also send the document data 300 stored in the storage unit 29 and input and output data of the task to the cloud server 1.

More specifically, the client control unit 200 acquires the task allocated to the local server 2 including the workflow information 320 and causes the local side processing to be executed by the local task execution unit 210.

Furthermore, the client control unit 200 can acquire the output data of each of tasks executed by the client server 2 and sent from the image forming apparatus 3, or the like, as document data 300 or task files 400. Moreover, the client control unit 200 can also pass the document data 300 or task file 400 as the input data for the next task to the cloud server 1.

Further, the client control unit 200 can also send the execution result 330 to the cloud side.

The local task execution unit 210 executes the task allocated to the local server 2, which is obtained by the client control unit 200.

In the present embodiment, the local task execution unit 210 causes each application to execute the task that has been determined by the cloud control unit 100 to be executed on the local server 2, and it obtains the execution result 330. At this time, the local task execution unit 210 can store the task file 400 associated with the received task in the local storage unit 290 or pass it to the application for execution.

In addition, in the present embodiment, the local task execution unit 210 can also acquire the document data 300 from the image forming apparatus 3 and temporarily store it in the storage unit 29.

The local task execution unit 210 can also acquire output data, or the like, for each of tasks of the workflow from the image forming apparatus 3 and store them in the storage unit 19 as a task file 400.

The cloud storage unit 190 is a database, a cloud storage, or the like, which stores files that are stored and accumulated on the cloud side with respect to the workflow. The details are explained below.

The local storage unit 290 is a database, a local storage, or the like, which stores files that are stored and accumulated on the local side with respect to workflow. The details of this are also explained below.

Here, the details of the files stored in the cloud storage unit 190 and the local storage unit 290 are described.

In the present embodiment, the cloud storage unit 190 stores document data 300, authorization information 310, workflow information 320, an execution result 330, and update information 340.

In the present embodiment, the local storage unit 290 stores the task file 400.

The document data 300 is data that is subject to various processes in the workflow. In the present embodiment, document data 300 may be a file of image data of a manuscript (document) scanned by the scanner in the image forming apparatus 3, a file created by a user and obtained from the terminal 4, or the like. Among these, the image data may be, for example, bitmap data such as BMP, compressed bitmap data such as TIFF or jpg, or electronic document data such as PDF (Portable Document Format), or the like. The document data 300 may also be a file of an application such as a word processor, spreadsheet, presentation, or the like. Also, the document data 300 may be a file previously stored in the document box of the user of the image forming apparatus 3 or the cloud server 1. Alternatively, the document data 300 may be a file acquired from a terminal 4, the other cloud server, or the like. Otherwise, the document data 300 may be other types of data.

Furthermore, the document data 300 may be a collection of a plurality of files rather than a single file. Alternatively, the document data 300 may be a set of image data in page units or page data. In addition, the document data 300 may include various character data, intermediate data, and task files 400, corresponding to the degree of progress of the processing of each of tasks described above.

In addition, the document data 300 may include metadata. This metadata may include, for example, whether information on the user's ID (identification), name, company name, amount of money, tax, or the like, can be obtained or not, and if so, the type of information. The document data 300 may also include, for example, the user's or group's e-mail address, the address of the application, the address of the document box (storage folder, shared folder), or the name and address of each application and information about each application account, or the like. The user's ID, or the like, may also be used in billing and service databases.

The authorization information 310 is information about the authority of the user who instructs the execution of the workflow. The authorization information 310 may include, for example, information such as an account setting, authorization of each application on the local server 2, or the like, for each user. Of these, the account settings include the user's ID and password to access the cloud server 1, local server 2, or local applications running on the local server 2, the group to which the user belongs, e-mail address, document box (storage folder, shared folder) address, or DMS application name or account, or the like, may be included.

The workflow information 320 is information that includes settings for the flow of processing for the "workflow," which is a series of tasks that the user instructs to execute. For example, in the case of a scanning workflow regarding the capture of a document, the workflow information 320 includes settings such as the processing order of the tasks of image processing, OCR processing, classification processing, and transmission processing, and the parameters of each of tasks. The workflow information 320 may, for example, include a script for executing the task, a "macro," and settings of RPA (Robotic Process Automation) tool (these are hereinafter referred to simply as the "script"). The script may include the account and content settings for running the application on the local server 2.

Further, the workflow information 320 can be set by the application installed in the image forming apparatus 3 or from the local server 2 or cloud server 1 by an administrator of the image forming apparatus 3, local server 2, cloud server 1, or the like.

The execution result 330 is a file that shows the execution result of a task of a workflow. The execution result 330 may be, for example, a file in XML (Extensible Markup Language) or JSON (JavaScript Object Notification) format, or the like. Further, the execution result 330 may include, for example, a flag indicating success or failure, character and numeric settings, or the like, for each of tasks. Furthermore, the execution result 330 may include the resulting data itself where the document data 300 is processed by the task. The resulting data may have packaged similar data as the task file 400. Additionally, the execution results 330 may be accumulated as a log data of the task execution per workflow or per task.

The update information 340 is the update data of the task file 400 regarding the tasks assigned to the local server 2 by the cloud control unit 100. In the present embodiment, the update information 340 may be a file cache of the task file 400 of the application executed on the local server 2. More specifically, the update information 340 may include various information for managing version and identifying the task file 400 in the local storage unit 290 of the local server 2. This various information may include, for example, file name and path (address), date and time, and version information. Furthermore, the update information 340 may include the difference data of the updates (differences) of the task file 400 between versions in a state as it is, encrypted, or compressed.

The task file 400 is a file for each of tasks in the workflow. In other words, the intermediate data at a time of executing or after being executed by the application of each of tasks may be stored as task file 400. Specifically, the task file 400 may be, for example, characters performed OCR for the document data 300, character or number data in a spreadsheet, a file of DMS or accounting information, a file of the other electronic document, or the like. The task file 400 for each of tasks may be updated according to the progress of the workflow tasks. In other words, the differences in each of task file 400 may be the updated information 340 described above in the form of a file cache.

Here, the control unit 10 of the cloud server 1 is made to function as the cloud control unit 100, the cloud task execution unit 110, and the update accumulation unit 120 by executing the control program stored in the storage unit 19.

Further, the control unit 20 of the local server 2 is made to function as the client control unit 200 and the local task execution unit 210 by executing the control program stored in the storage unit 29.

In addition, each part of the image forming system X described above is a hardware resource that executes the image forming method of the present disclosure.

In addition, some or any combination of the functional configurations described above may be configured hardware or circuitry with ICs, programmable logic, FPGA (Field-Programmable Gate Array), or the like.

[Workflow Making Process According to the Image Forming System X]

Next, with reference to FIG. 4, a workflow making process by the image forming system X according to the embodiment of the present disclosure is explained.

In the workflow making process according to the present embodiment, the user accesses the cloud server 1 and creates a workflow. At this time, the workflow information 320 specifies an executable permission of an application for the user, or the like. Also, the workflow information 320 may include scripts, or the like, for executing the application on the local server 2.

The workflow making process in the present embodiment is mainly performed by the control unit 10 of the cloud server 1, which executes the program stored in the storage unit 19 in cooperation with each part and by using hardware resources. In the following, with reference to the flowchart in FIG. 4, the details of the workflow making process for the present embodiment are explained step by step.

(Step S101)

Firstly, the cloud control unit 100 performs a cloud login process.

In the present embodiment, a user such as the administrator of the image forming system X logs in to the cloud server 1 by using a web browser or a dedicated application for workflow (hereinafter simply referred to as the "dedicated application") from terminal 4.

At this time, the cloud control unit 100 may perform authentication based on the account settings in the authorization information 310.

(Step S102)

Next, the cloud control unit 100 performs a workflow command acquisition process.

After successful the authentication, the UI of the workflow creation screen is displayed on the display of terminal 4 by the web browser or the dedicated application. Based on this UI, the cloud control unit 100 acquires a user instruction and generates the workflow information 320.

In the present embodiment, as an example, the workflow information 320 that includes tasks of a paper document scan and upload (T1), an OCR (T2), a price and customer information extraction (T3), an accounting information update (T4), and a PDF conversion and storing (T5) as a series of operations (tasks) is generated. In other words, according to the user's designation, the cloud control unit 100 can set the content of the application to be executed and the order to be executing.

In such case, the workflow that can be generated may be limited by the user's authority. Specifically, the cloud control unit 100 may allow any user who can access to a business partner information and accounting information to create such a workflow.

(Step S103)

Next, the cloud control unit 100 performs a local server designation process.

If the task instructed by the user is to be performed on the local server 2, the cloud control unit 100 designates the local server 2 to be linked to and sets it in the workflow information 320. At this time, the cloud control unit 100 generates a workflow with a script added to execute the application on the local server 2. This script may be set up in advance by the user or generated by an AI (Artificial Intelligence) for automatic generation, such as a Transformer, or the like.

(Step S104)

Then, the cloud control unit 100 performs the authorization user designation process.

Based on the user's authorization in the authorization information 310, the cloud control unit 100 sets the authorization that can execute the workflow and the user in the workflow information 320. Then, the cloud control unit 100 stores the workflow information 320 in the cloud storage unit 190.

This concludes the workflow making process according to the present disclosure.

[Task Allocation and Execution Process According to the Image Forming System X]

Figure 5:
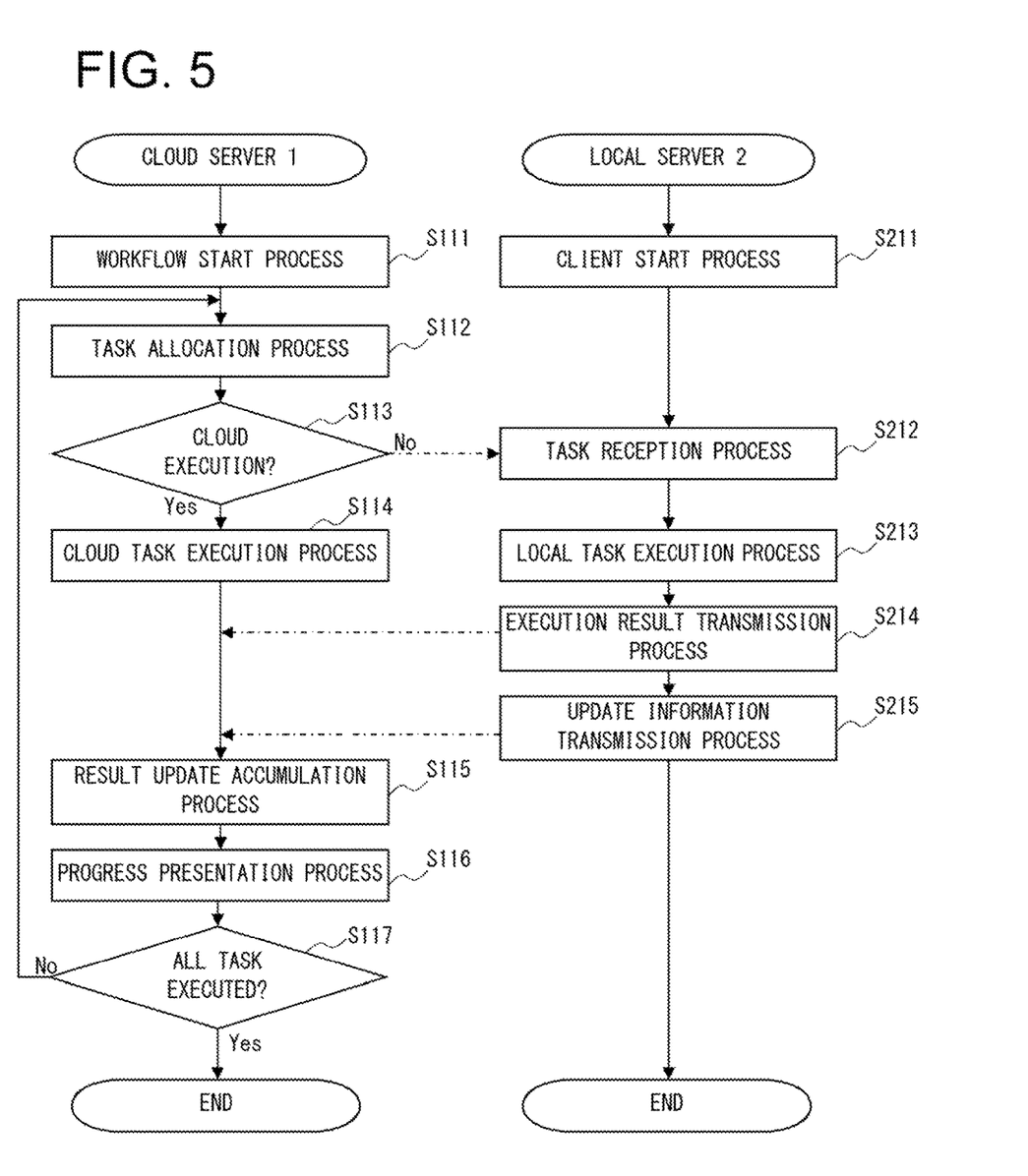
FIG. 5 is a flowchart of the task allocation and execution process according to the embodiment of the present disclosure.
Figure 6:
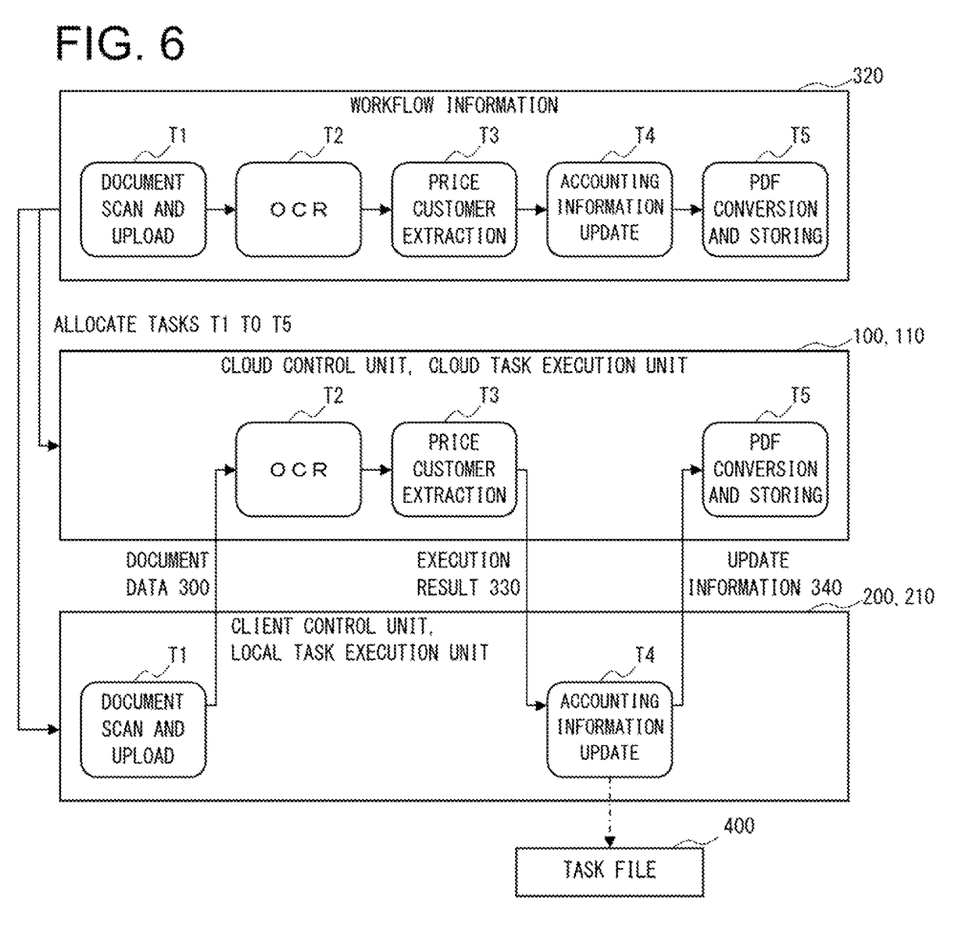
FIG. 6 is a conceptual diagram of the task allocation and execution process as shown in FIG. 5.

Next, with reference to FIGS. 5 and 6, a task sorting and execution process by the image forming system X according to the present embodiment of the disclosure is explained.

In the task sorting and execution process according to the present embodiment, tasks on the cloud side and the local side are combined and automated via workflow.

In the task sorting and execution process according to the present embodiment, mainly, the control unit 10 of cloud server 1 executes the program stored in storage unit 19 on the cloud side, and the control unit 20 of local server 2 executes the program stored in storage unit 29 on the local side, with cooperative working with each unit and by using hardware resources.

In the following, with reference to the flowchart in FIG. 5, the details of the task allocation and execution process are explained step by step.

(Step S111)

Firstly, the cloud control unit 100 of the cloud server 1 performs a workflow start process.

Here, the user logs in from terminal 4. This process is similar to the cloud login process in step S101 of FIG. 4 as described above. Then, the user selects any workflow in the cloud application and instructs execution. The cloud control unit 100 then sends a command to the local server 2 to start the workflow.

Alternatively, the cloud control unit 100 can also select a workflow and instruct execution according to the settings on the local side. In other words, it is also possible for the user to log in to the cloud server 1 from the image forming apparatus 3, a terminal on the local side, or the like, select a workflow, and instruct its execution.

Otherwise, if the image forming apparatus 3 has been configured to execute the workflow, the cloud control unit 100 may acquire instruction such as a button by the user, or the like, via the local server 2, select and start the workflow based on this instruction.

(Step S211)

Here, the client control unit 200 of the local server 2 performs a client start process.

When the command for the workflow is received from the cloud server 1, the client control unit 200 of the local server 2 starts execution and waits to receive commands and files from the cloud server 1. At this time, communication between the local side and the cloud side can be made secure by using public key cryptography, or the like. This enables processing on the local side to be executed according to the workflow.

Alternatively, the client control unit 200 may be always executed in a resident, or the like, or it may be executed according to the settings of the OS, such as the task manager or CRON on the local server 2.

(Step S112)

The processing of the cloud Server 1 is described again. The cloud control unit 100 of cloud server 1 performs a task allocation process.

The cloud control unit 100 refers to the workflow information 320 and allocates each of the tasks to the cloud server 1 or local server 2 for each of tasks as the workflow progresses. In other words, the cloud control unit 100 allocates the tasks executed by the cloud-side application to the cloud server 1. On the other hand, it allocates the tasks to be executed by the local-side application to the local server 2.

Specifically, for example, the cloud control unit 100 may allocate the acquisition of document data 300 to the cloud server 1 when the user uploads the document data 300 directly to the cloud side. Alternatively, the cloud control unit 100 may allocate the document data 300 to the local server 2 when the document data 300 is scanned from the image forming apparatus 3 and uploaded.

Here, the cloud control unit 100 can also refer to the authorization information 310 and change the allocation of each of tasks according to the authorization information 310 of the user who instructs the execution of the workflow.

Specifically, for example, if the user is not authorized to scan at the image forming apparatus 3 in the user's authorization information 310, the cloud control unit 100 may assign the task of acquiring the document data 300 to the cloud server 1. In other words, the cloud control unit 100 may only allow the user to upload files to the cloud server 1. Otherwise, if the user does not have access authority, or the like, to the files on cloud server 1, the task may be assigned to be performed on the local server 2 side.

Also, the cloud control unit 100 may change the allocation according to the authorization of the application to be executed on the local server 2.

Specifically, for example, if the logged-in user has the authority to execute the application related to the task on the local server 2 (hereinafter referred to as a "local application"), the cloud control unit 100 may allocate the task to the local server 2.

Conversely, if the logged-in user does not have the authority to execute the local application but have the authority to execute the application related to the task on the cloud server 1 (hereinafter referred to as a "cloud application"), the cloud control unit 100 may allocate the task to the cloud server 1.

In addition, the cloud control unit 100 may also set and restrict the storage location and the execution of the application based on the metadata of the document data 300 processed in the workflow. In this case, before the workflow execution, based on the user instruction, it may be possible to set which document data 300 is to be used in the workflow in the workflow information 320.

(Step S113)

Then, the cloud control unit 100 determines whether or not the task is to be executed in the cloud. The cloud control unit 100 determines Yes for the task allocated to the cloud server 1. The cloud control unit 100 determines No for other cases, that is, for the task allocated to the local server 2.

If Yes, the cloud control unit 100 proceeds to step S114.

If No, the cloud control unit 100 advances the process to step S212.

(Step S114)

In the case of the task allocated to cloud server 1, the cloud task execution unit 110 performs the cloud task execution process.

The cloud task execution unit 110 executes the task allocated to cloud server 1 in the workflow. Specifically, the cloud task execution unit 110 causes the cloud application to be executed by, for example, issuing a task command according to the setting of the workflow information 320. At this time, the cloud task execution unit 110 can execute arbitrary processing by using the script that causes the cloud application execute. The execution result 330 or task file 400 of the cloud application may be handed over to a subsequent cloud-side task or sent to the local server 2 for a local application on the local side. That is, the file of the execution result 330 of the task may be acquired and passed over as input data of the next task.

The cloud task execution unit 110 then proceeds to step S115.

(Step S212)

In the case of a task allocated to the local server 2, the client control unit 200 performs a task reception process.

The client control unit 200 receives the command for the task allocated to the local server 2, the task file 400 for this task, or the like, from the cloud server 1 and stores it in the local storage unit 290. At this time, the client control unit 200 may decrypt the encrypted command or the task file 400. Alternatively, the client control unit 200 may pass the command or the task file 400 directly to the local task execution unit 210.

(Step S213)

Then, the local task execution unit 210 performs a local task execution process.

The local task execution unit 210 executes the task of the workflow that is allocated to the local server 2. Specifically, the local task execution unit 210 causes the local application to execute the task according to the settings in the workflow information 320. In such case, the local task execution unit 210 may use the task file 400, which may be obtained from the cloud server 1. Alternatively, the local task execution unit 210 may execute the local application based on the settings of the local server 2 by using only the command for the task. In these cases, the local task execution unit 210 can be made to execute any process by the script.

Here, it is also possible that a task file 400 is generated as a result of executing the local application. In such case, in the present embodiment, the local task execution unit 210 stores this task file 400 in the local storage unit 290. After that, the local task execution unit 210 generates a file cache of the differences from the previous version of the task file 400 as update information 340.

(Step S214)

Then, the client control unit 200 performs an execution result transmission process.

The client control unit 200 sends back execution results 330, task file 400, document data 300, or the like, to the cloud side. As a result, the document data 300 and the task file 400 are processed, and the other file is exchanged between the cloud server 1 and the local server 2. As a result, the cloud task execution unit 110 and the local task execution unit 210 cause each of tasks to be processed as the series of tasks, which is the workflow.

In addition, the local task execution unit 210 may also generate and send temporary files of execution results 330 and task files 400, and it send and receive data in a specific unit such as pages, or the like. Also, when an error occurs in the execution of the local application or generation of a file, or the like, the local task execution unit 210 can also send this information as an execution result 330.

(Step S215)

Then, client control unit 200 performs an update information transmission process.

The client control unit 200 sends the update information 340 of the task file 400 generated as the execution result of the local application to the cloud server 1.

(Step S115)

Here, again, the process at cloud server 1 is described. The cloud control unit 100 and the update accumulation unit 120 of cloud server 1 perform an update storing process.

At this time, the cloud control unit 100 stores the execution result 330 in the cloud storage unit 190. At this time, the cloud control unit 100 may store the execution result 330 on the local side in the cloud storage unit 190 as a log.

The cloud control unit 100 also acquires the update information 340.

The update accumulation unit 120 stores this update information 340 for the task file 400 on the local side in the cloud storage unit 190 for each version of the task file 400 as a file cache.

(Step S116)

Here, the cloud control unit 100 performs a progress presentation process.

In this process, the cloud control unit 100 can present the progress of workflow execution upon request from the other apparatus.

Specifically, the cloud control unit 100 presents the execution status of the workflow task when the user logged in from terminal 4 or the image forming apparatus 3 instructs to do so. This allows the user to check the execution status from the web browser or the dedicated application on terminal 4, the operation panel of the image forming apparatus 3, or the like. In other words, if workflow processing is completed, an error occurs, or it is stopped, the user can check these via the UI.

In addition, the cloud control unit 100 can also directly notify the user that the workflow task has been completed via an e-mail, a SMS (Short Message Service), a SNS (Social Networking Service), a messenger service, IRC (Internet Relay Chat), or the like.

(Step S117)

Then, the cloud control unit 100 determines whether all the tasks have been executed. The cloud control unit 100 determines Yes if all the tasks in the workflow have been completed. Here, the cloud control unit 100 may also determine Yes if the workflow has stopped due to an error. The cloud control unit 100 otherwise determines No.

If Yes, the cloud control unit 100 completes the task allocation and execution process. In the case of the error, the user can be notified that effect.

If No, the cloud control unit 100 returns the process to step S112 and continues the execution of the task of the workflow.

This concludes the task allocation and execution process according to the present disclosure.

Here, as refer to FIG. 6, a specific example of the task allocation and execution process. FIG. 6 shows an example of execution for a series of tasks T1 to T5 included in the workflow information 320. In this example workflow, in order to execute a series of tasks, it is necessary to combine and execute the cloud application and the local application. Thus, the cloud server 1 allocates each of the tasks to the cloud server 1 or the local server 2. Specifically, the cloud application performs OCR processing, and the local application for accounting, which is stored only on the local server 2, updates accounting information.

To automate the execution of the series of tasks, a user-created workflow is executed.

Firstly, as the task T1, the user logs in at the image forming apparatus 3, gives the workflow instructions, and a paper document is scanned. Then, the document data 300 is uploaded to the cloud side.

Then, as the task T2, the uploaded document data 300 is OCR processed.

Then, as the task T3, the text and numerical data retrieved by OCR are handed over as Task File 400, and the price and customer information are extracted.

Then, as task T4, this price and customer information is sent to the local server 2 as task file 400, and the local application for accounting is executed. This updates the accounting information, and this accounting information is stored in the local storage unit 290 as a new version of the task file 400. At this time, a file cache, which is a difference file between the new version of the task file 400 and the old accounting information, is generated as update information 340. Thus, at least part of this task file 400 is then included in the execution result 330 and sent to the cloud server 1 with the generated update information.

Then, as task T5, the cloud server 1 receives the execution result 330, converts it to PDF, and stores the PDF in the cloud storage unit 190. The cloud server 1 also receives the update information 340 and stores it as a log in the cloud storage unit 190.

This completes the execution of the workflow.

[File Restoration Process by Image Forming System X]

Figure 7:
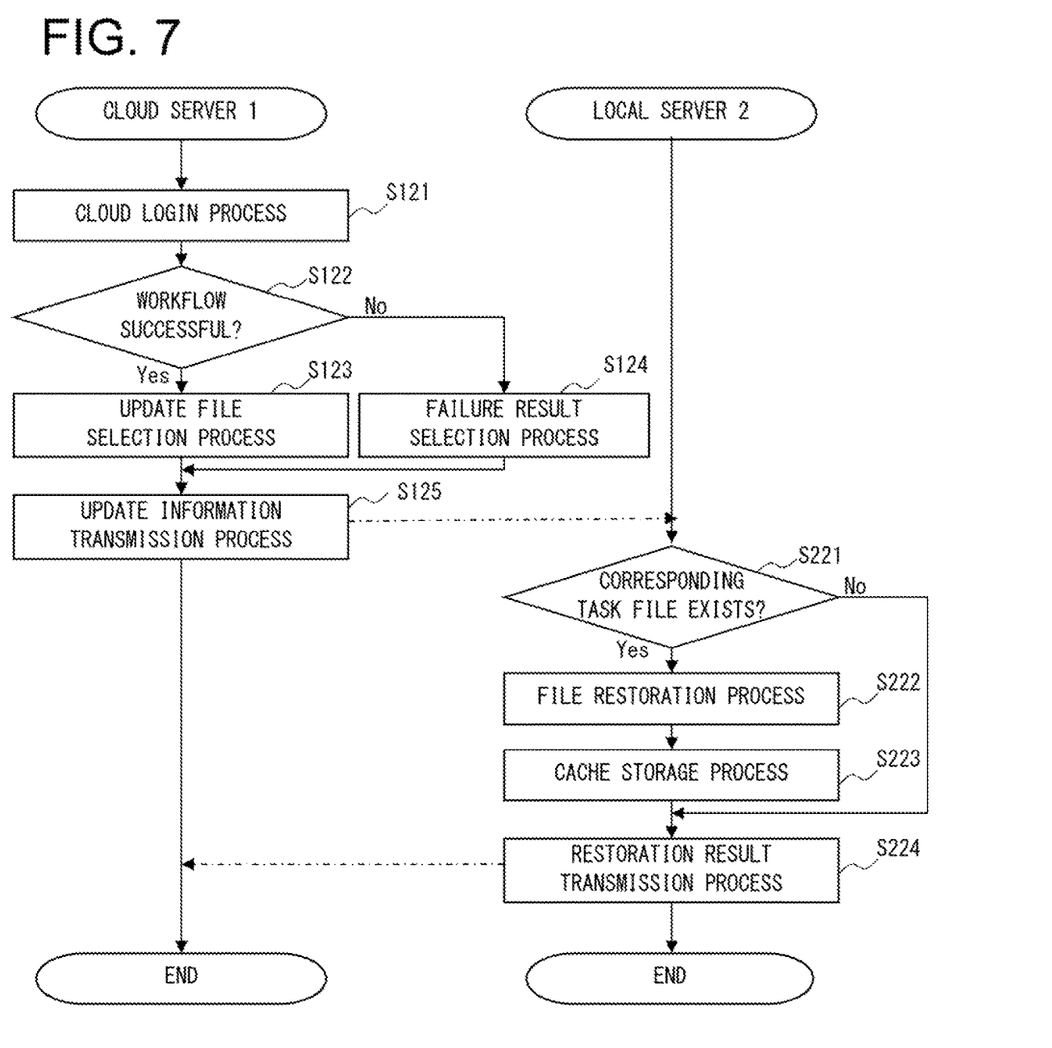
FIG. 7 is a flowchart of the file restoration process according to the embodiment of the present disclosure.

Next, with reference to FIG. 7, the file restoration process in the workflow by the image forming system X according to the present embodiment of the disclosure is explained.

In the file restoration process according to the present embodiment, the old version of the task file 400 is restored via the workflow information 320 based on the update information 340 stored on the cloud side. In other words, the workflow is reversed back and the stored task file 400 can be restored to the past version. In this case, since only the file cache, which is the update information 340, is stored on the cloud side, the capacity of the cloud side does not be squeezed.

The file restoration process according to the present embodiment is mainly executed on the cloud side by the control unit 10 of the cloud server 1 by using the program stored in the storage unit 19, and on the local side by the control unit 20 of the local server 2 by using the program stored in the storage unit 29 with hardware resources in cooperation with each part.

In the following, with reference to the flowchart in FIG. 7, the details of the file restoration process are explained step by step.

(Step S121)

Firstly, the cloud control unit 100 performs the cloud login process.

Here, the user logs in the cloud application via terminal 4 or image forming apparatus 3. This log in is performed with a similar process as in step S101 on FIG. 4 and in step S111 on FIG. 5.

(Step S122)

Here, the cloud control unit 100 of the cloud server 1 determines whether the workflow is successful or not. The cloud control unit 100 refers to the log of the execution result 330 of the workflow and determines Yes if the series of tasks of the workflow has been successfully completed and the workflow execution has been completed. In other cases, the cloud control unit 100 determines No as the workflow failed. The cloud control unit 100 determines the series of tasks in the workflow failed, for example, if at least one of the execution result 330 of the workflow is a failure.

If Yes, the cloud control unit 100 proceeds to step S123.

If No, the cloud control unit 100 advances the process to step S124.

(Step S123)

If the workflow is successful, the cloud control unit 100 performs the update file selection process.

The cloud control unit 100 selects the file name, or the like, of the task file 400 according to the user's instruction via the UI. Further, the cloud control unit 100 selects the update information 340 of the workflow at the time when outputting the task file 400 to be restored to the old version. That is, this update information 340 is the file cache when the task file 400 to be restored is outputted.

(Step S124)

If the workflow fails, the cloud control unit 100 performs a failure result selection process.

If the execution result 330 of the workflow is a failure, the cloud control unit 100 selects the updated information 340 at the time of the failure. This enables the selection of the update information 340 of the workflow that output the task file 400 to be restored to the version before the failure.

(Step S125)

Here, the cloud control unit 100 performs the update information transmission process.

The cloud control unit 100 sends the update information 340, which is the file cache of the task file 400 to be restored, and a command (an instruction) for restoration to the local server 2. Here, if there is a plurality of previous versions up to that version, the cloud control unit 100 may send a plurality of update information 340.

(Step S221)

Here, the client control unit 200 of the local server 2 determines whether the corresponding task file 400 exists or not. The client control unit 200 receives the update information 340 and a command for restoration from the cloud server 1 and finds in the local storage unit 290 whether the task file 400 for restoration exists or not. The client control unit 200 determines Yes if the corresponding task file 400 exists. The client control unit 200 determines No otherwise, that is, if the task file 400 has been erased or altered for some reason.

If Yes, the client control unit 200 proceeds the process to step S222.

If No, the client control unit 200 proceeds the process to step S224.

(Step S222)

If the corresponding task file 400 exists, client control unit 200 performs a file restoration process.

The client control unit 200 executes file restoration to restore the old version of task file 400. Specifically, the client control unit 200 reads the relevant task file 400 stored in the local storage unit 290 and generates a file restored to the older version based on the file cache of the update information 340.

(Step S223)

Then, the client control unit 200 performs a cache storage process.

The client control unit 200 separately stores the task file 400 before executing restoration as a file cache in the local storage unit 290. In other words, this file is a new version and is backed up just in case.

(Step S224)

Here, the client control unit 200 performs a restoration result transmission process.

The client control unit 200 notifies the cloud application that the task file 400 has been restored to the old version.

Alternatively, if the corresponding task file 400 does not exist, the client control unit 200 can notify the cloud application to that effect.

Further, the client control unit 200 may send the task file 400 itself, which has been restored to the older version, to the cloud server 1. This allows the user to access the cloud server 1 from the terminal 4 or the image forming apparatus 3 and download and acquire the old version of the task file 400.

Furthermore, the client control unit 200 may send the file cache of the older version or the new version as described above to the cloud server 1 again as update information 340.

This completes the file restoration process according to the present disclosure.

As configured in this way, the following effects can be obtained.

In typical technology, files processed by the cloud application are stored on the cloud side. In other words, the processing results of the cloud application could not be directly saved to a local server or a client PC.

However, depending on the user's environment, in the workflow for image formation, there may be a need to pass the file for the next task to the local side after processing the task. In this case, it is necessary to retain the task file, which is in the cloud side, in the local side once. Thus, it has been a double hassle.

Therefore, there is a need for an information processing system that combines tasks on the cloud side and tasks on the local side and processes them automatically in a workflow.

In contrast, the image forming system X according to the embodiment of the present disclosure is an information processing system provided with a cloud server 1 and a local server 2 for executing an image forming workflow for a document, and the cloud server 1 includes: a cloud control unit 1000 that allocates each of tasks of the workflow to the cloud server 1 or the local server 2, and a cloud task execution unit 110 that executes a task allocated to the cloud server 1 by the cloud control unit 100; and the local apparatus includes: a client control unit 200 that sends and receives a task allocated to the local server 2 and an execution result 330 of the task from the cloud server 1 to and from the cloud server 1, and a local task execution unit 210 that executes a task allocated to the local server 1 that is acquired by the client control unit 200.

This configuration makes it possible to combine a cloud-side task and a local-side task and process them automatically in a workflow. That is, the local server 2 is provided with a client control unit 200 that receives a task from the cloud and can receive and process a task from the cloud server 1. This makes it possible to combine and automate tasks from the cloud side and the local side in the image formation workflow.

Further, in the image forming system X of the present disclosure, the cloud control unit 100 changes the allocation of each of the tasks according to authorization information 310 of the user who instructs the execution of the workflow. By configuring the system in this way, the authorization information 310, and the like, of the user managed on the cloud side can be used to restrict the processing content on the local side. This allows setting or restricting the storage destination of task file 400, execution of applications, or the like, based on the user's account settings, or the like, set in the authorization information 310. As a result, it is possible to set and limit the contents of tasks on the local side by using user information on the cloud side.

In the image forming system X of the present disclosure, the cloud control unit 100 changes the allocation of each of the tasks according to the authority of the application executed on the local server 2 as the authorization information 310.

By configuring in this way, the content and order of task processing can be changed according to the authority of the local application that is linked on the local side. Thus, it is possible to execute tasks in the workflow more flexibly. Also, the tasks can be processed more reliably.

Further, in the image forming system X of the present disclosure, the cloud control unit 100 specifies executable authorization and a user, and it generates the workflow by adding a script for executing the application on the local server 2.

By configuring the system in this way, it is possible to execute the local application reliably on the local side. Therefore, in the workflow, it is possible to reliably execute the series of tasks by cooperating between the cloud side and the local side.

Further, in the image forming system X of the present disclosure, the cloud control unit 100 presents the progress of the execution of the workflow in response to a request from another apparatus.

By configuring in this way, the user can confirm how far the workflow has progressed or where it has failed on the UI, or the like. In other words, since the log of the execution result 330 on the local side is stored on the cloud side, the progress of execution of tasks on the local side can also be checked via the UI of the dedicated application in the cloud, or the like. Thus, it is possible to meet the needs of users who wish to manage a local workflow on the cloud side.

In addition, in typical technology, it is possible to have files synchronized between the cloud side and the local PC. However, it can't meet the demands of users who "do not want to keep files on the cloud side," "want to minimize storage costs on the cloud side," and the like.

In contrast, the image forming system X according to the embodiment of the present disclosure is an information processing system that has a cloud server 1 and a local server 2 for executing an image forming workflow for a document, and the cloud server 1 includes: a cloud control unit 100 that allocates each of tasks of the workflow to the cloud server 1 or the local server 2, and an update accumulation unit 120 that accumulates an update information 340 of a task file 400 related to the task allocated to the local server 2 by the cloud control unit 100; and the local server 2 includes: a client control unit 200 that sends and receives an execution result 330 of the task allocated by the cloud server 1 and the update information 340 to and from the cloud server 1, and a local storage unit 290 that stores the task file 400 related to the task that is allocated to the local server 2 and is acquired by the client control unit 200.

With this configuration, the actual task file 400 is stored on the local side and only the update information 340 is provided on the cloud side, eliminating the need to store the task file 400 on the cloud side. That is, a file cache for version management can be stored as the update information 340 on the cloud side, and older versions of files can be restored via workflow. In addition, since the task file 400 itself is not stored on the cloud side, storage costs on the cloud side can be reduced. Furthermore, security can be increased.

Further, in the image forming system X of the present disclosure, the cloud control unit 100 sends the update information 340 to the local server 2 by the instruction of the user for the workflow, and the client control unit 200 restores the task file 400 stored in the local storage unit 290 to the older version based on the update information 340. By configuring the system in this way, the workflow can be traced backwards and the task file 400 stored on the local side can be restored to the previous version. This improves user-friendliness.

Further, in the image forming system X of the present disclosure, the cloud control unit 100 selects the update information 340 based on the execution result 330 of the workflow and restores the task file 400 to the older version. By configuring the system in this way, any older version of the task file 400 can be restored based on the user instruction. Thus, user convenience can be enhanced.

Further, in the image forming system X of the present disclosure, the cloud control unit 100, when the execution result 330 of the workflow is a failure, restores the task file 400 to the version before the failure.

This configuration makes it possible to restore the state immediately before the failure even if the workflow fails in the middle of the series of workflow tasks. Thus, it becomes easier to modify the workflow information 320 and execute the workflow again, thereby increasing user convenience.

Other Embodiments

In addition, in the embodiments described above, an example in which tasks are assigned by using the workflow information 320 that has already been set is described.

However, in the image forming system X according to the other embodiments of the present disclosure, the cloud control unit 100 may set and restrict the storage location and application execution based on metadata of the document data 300 processed in the workflow.

By configuring in this way, it is possible to dynamically set or restrict the storage destination and the execution of the application according to the metadata of the document data 300, or the like. Therefore, for example, the workflow information 320 can be selected according to the document data 300 uploaded by the user. In addition, the task allocation can be changed according to the conditions set in the selected workflow information 320. In other words, it is possible to change whether each of tasks is allocated to the cloud side or the local side according to the metadata settings of the document data 300.

Thus, for example, for each of tasks in a workflow, the document data 300 of a user who is not authorized to use the local application on the local server 2 can be executed by the cloud application on the cloud server 1. Conversely, for the document data 300 of a user who is not authorized to use the cloud application on the cloud server 1, the local application can be executed on local server 2.

Further, in the above embodiment, the cloud server 1 and the local server 2 are described as sharing the series of tasks. However, either apparatus may perform all of the series of tasks. For example, if processing on the local server 2 is more convenient in terms of processing time, convenience, security, or the like, the local server 2 may perform the entire series of tasks. Otherwise, in a configuration where the local server 2 is provided with only the client control unit 200, the local server 2 can simply store the task file 400, and the actual tasks can all be performed by the cloud server 1.

Further, in the above embodiment, an example with the cloud Server 1 as the cloud apparatus and the local Server 2 as the local apparatus has been described. However, the local apparatus on the local side may be a user's client PC or an image forming apparatus 3. If the local apparatus is a high-performance image forming apparatus 3, it may perform all the series of tasks such as image processing, OCR processing, classification processing, transmission processing, or the like. Also, the cloud server 1 may also be allocated to perform the tasks.

By configuring the system in this way, the series of tasks can be executed with optimal efficiency and speed in response to the installation environment.

Further, in the above embodiment, only one local server 2 is provided in FIG. 1. However, there may be a plurality of local servers 2. In such case, each of the local servers 2 may exist for each intranet. In this case, the tasks may be allocated to each of the local servers 2 and the image forming apparatus 3. There may also be a plurality of cloud servers 1 itself.

This configuration makes it possible to flexibly allocate tasks to each apparatus for efficient processing.

Further, in the above embodiment, the acquisition of the execution result 330 is described as being done after the execution of the workflow task.

However, the acquisition of the execution result 330 by the cloud server 1 may be performed after the execution of the series of tasks on the local side is completed or fails, or after all tasks on the cloud and local sides are completed or fail.

By configuring the system in this way, the processing load and network load for acquiring the execution result 330 can be reduced, and the execution result 330 can be acquired in accordance with the state of the apparatus at the time of execution. This can increase the possibility of efficiently executing the processing of each of tasks.

Further, the present disclosure can also be applied to document reading apparatuses other than the image forming apparatus 3. Furthermore, the configuration may be such that the document reading apparatus and the local server 2 are directly connected without using the network 5. In other words, the configuration may use a network scanner, a server with a scanner separately connected via USB, or the like.

This configuration makes it possible for document reading apparatuses other than the image forming apparatus 3 to share tasks and process them efficiently at high speed.

Further, in the above-described embodiment, as the workflow of image formation, the sharing of each of tasks of the scan workflow related to document capture is described. However, the other types of workflows can also be supported. In addition, tasks other than image processing, OCR processing, extraction processing, classification processing, and transmission processing can also be allocated.

By configuring the system in this way, the tasks can be flexibly assigned and executed.

In addition to the control units 10 and 20, the cloud server 1 and local server 2 may be provided with a control computing unit for high-speed execution of OCR processing and classification processing. The control computing unit may be an ASIC, a DSP, an external accelerator, or the like, for high-speed execution of specific operation such as the artificial neural network, or the like.

Also, in terms used herein, the singular "a," "an," and "the" also include the plural form unless the context clearly indicates otherwise.

It goes without saying that the configuration and operation of the above-mentioned embodiments are examples, and it may be changed and implemented as appropriate to the extent not departing from the aim of the present disclosure.

What is claimed is:

1. An information processing system having a cloud apparatus and a local apparatus for executing an image forming workflow for a document, and
the cloud apparatus comprising:
a cloud control unit configured to allocate each of tasks of the workflow to the cloud apparatus or the local apparatus, and
an update accumulation unit configured to accumulate update information of a file related to a task allocated to the local apparatus by the cloud control unit; and
the local apparatus comprising:
a client control unit configured to send and receive an execution result of the task allocated by the cloud apparatus and the update information to and from the cloud apparatus, and
a local storage unit that stores the file related to the task that is allocated to the local apparatus and is acquired by the client control unit.

2. The information processing system according to claim 1, wherein
the cloud control unit sends the update information to the local apparatus by an instruction by a user for the workflow, and
the client control unit restores the file of the task stored in the local storage to an older version based on the update information.

3. The information processing system according to claim 2, wherein
the cloud control unit selects the update information based on the execution result of the workflow and restores the file of the task to an older version.

4. The information processing system according to claim 2, wherein
the cloud control unit, when the execution result of the workflow is a failure, restores the file of the task to the version before the failure.

5. The information processing system according to claim 1, wherein
the cloud control unit sets and restricts storage destination and the execution of an application based on metadata of document data processed in the workflow.

6. An image forming system having a cloud apparatus and a local apparatus for executing an image forming workflow for a document, and
the cloud apparatus comprising:
a cloud control unit configured to allocate each of tasks of the workflow to the cloud apparatus or the local apparatus, and
an update accumulation unit configured to accumulate update information of a file related to a task allocated to the local apparatus by the cloud control unit; and
the local apparatus comprising:
a client control unit configured to send and receive an execution result of the task allocated by the cloud apparatus and the update information to and from the cloud apparatus, and
a local storage unit that stores the file related to the task that is allocated to the local apparatus and is acquired by the client control unit.

7. The image forming system according to claim 6, wherein
the cloud control unit sends the update information to the local apparatus by an instruction by a user for the workflow, and
the client control unit restores the file of the task stored in the local storage to an older version based on the update information.

8. The image forming system according to claim 7, wherein
the cloud control unit selects the update information based on the execution result of the workflow and restores the file of the task to an older version.

9. The image forming system according to claim 7, wherein
the cloud control unit, when the execution result of the workflow is a failure, restores the file of the task to the version before the failure.

10. The image forming system according to claim 6, wherein
the cloud control unit sets and restricts storage destination and the execution of an application based on metadata of document data processed in the workflow.

11. An information processing method executed by an information processing system having a cloud apparatus and a local apparatus for executing an image forming workflow for a document, comprising the steps of:
allocating, by the cloud apparatus, each of tasks of the workflow to the cloud apparatus or the local apparatus;
executing, by the local apparatus, a task allocated to the local apparatus;
storing, by the local apparatus, a file related to the task allocated to the local apparatus;
sending, by the local apparatus, an execution result of the task allocated to the local apparatus and update information of the file of the task to the cloud apparatus;
accumulating, by the cloud apparatus, the update information as a file cache.

12. The information processing method according to claim 11, further comprising
sending, by the cloud apparatus, the update information to the local apparatus by an instruction by a user for the workflow, and
restoring, by the local apparatus, the file of the task stored by the local apparatus to an older version based on the update information.

13. The information processing method according to claim 12, further comprising
selecting the update information based on the execution result of the workflow and restores the file of the task to an older version.

14. The information processing method according to claim 12, further comprising
restoring, when the execution result of the workflow is a failure, the file of the task to the version before the failure.

15. The information processing method according to claim 11, wherein
setting and restricting storage destination and the execution of an application based on metadata of document data processed in the workflow.

* * * * *